United States Patent [19]

Petricca

[11] 4,107,343
[45] Aug. 15, 1978

[54] WHIPPABLE EMULSION STABLE AT ROOM TEMPERATURE

[75] Inventor: Anthony V. Petricca, Cleveland, Ohio

[73] Assignee: SCM Corporation, Cleveland, Ohio

[21] Appl. No.: 854,088

[22] Filed: Nov. 23, 1977

Related U.S. Application Data

[63] Continuation-in-part of Ser. No. 739,511, Nov. 8, 1976, abandoned, which is a continuation of Ser. No. 589,497, Jun. 23, 1975, abandoned.

[51] Int. Cl.² .............................................. A23G 3/00
[52] U.S. Cl. .................................. 426/564; 426/570; 426/399
[58] Field of Search ................... 426/98, 99, 103, 564, 426/568, 570, 804, 399

[56] References Cited

U.S. PATENT DOCUMENTS

| | | | |
|---|---|---|---|
| 3,230,091 | 1/1966 | Thompson | 426/570 |
| 3,350,209 | 10/1967 | Rodgers | 426/570 |
| 3,353,965 | 11/1967 | Patterson | 426/570 |
| 3,495,990 | 2/1970 | Kayser | 426/570 |
| 3,560,220 | 2/1971 | Bangert | 426/98 |
| 3,806,605 | 4/1974 | Patterson | 426/570 |

*Primary Examiner*—Jeanette M. Hunter
*Attorney, Agent, or Firm*—Merton H. Douthitt; James B. Wilkens

[57] ABSTRACT

A pourable, whippable, edible emulsion, containing about 45 to 60% water, 20 to 30% fat, 7 to 20% sweetener, 0.5 to 2.5% dispersible protein, 0.1 to 0.75% thickener, 0.1 to 1.0% buffer and 0.75 to 2.5% emulsifier, where the emulsifier has a major proportion of propylene glycol monostearate or hexaglycerol distearate in the range from 0.5 to 1.5% and a minor proportion of a combination of ethoxylated sorbitan ester in the range from 0.3 to 0.6%, sorbitan monostearate in the range from 0.05 to 0.25% and lecithin in the range from 0 to 0.15%, is stable against separation and/or gelation for at least one year at room temperature under aseptic conditions and whippable to at least 200% overrun from about 40° to 100° F.

8 Claims, No Drawings

WHIPPABLE EMULSION STABLE AT ROOM TEMPERATURE

CROSS-REFERENCE TO RELATED APPLICATIONS

The present application is a continuation-in-part of my pending application Ser. No. 739,511 filed Nov. 8, 1976, now abandoned which in turn is a continuation of my copending application Ser. No. 589,497 filed June 23, 1975 and now abandoned.

BACKGROUND OF THE INVENTION

Heretofore a variety of whippable emulsions have been proposed for food toppings. The fluid ones of commerce are usually stored in refrigerated or frozen condition to prolong their shelf stability. Dry powder types have prolonged shelf stability, but require reconstitution with water or milk and fairly special handling to whip efficiently. These products will not normally stand the heat processing required to render them commercially sterile and yet remain stable at ordinary room temperature while still retaining the convenient fluid condition. All are oil-in-water emulsions containing fat variously emulsified, sweetener, and often dispersible protein, thickener, and buffer salt, usually with some flavor and color.

SUMMARY OF THE INVENTION

The present invention is a pourable, edible, whippable homogenized emulsion comprising water, fat, sweetener, dispersible protein, thickener, buffer and emulsifier, the emulsifier comprising a major proportion of a partial fatty ester of propylene glycol or a fatty polyglycerol ester and a minor proportion of partial fatty esters of higher polyols and their ethoxylated derivatives, such polyols being glycerin, sorbitol with inner anhydride groups (sorbitan), and the like.

A preferred formulation is a pourable, edible, homogenized emulsion consisting essentially of, by weight based on total emulsion, about 45 to 60% water, about 20 to 30% fat, about 7 to 20% sweetener, about 0.5 to 2.5% dispersible protein, about 0.1 to 0.75% thickener, about 0.1 to 1.0% buffer and about 0.75 to 2.5% emulsifier, said emulsifier consisting essentially of a major proportion of propylene glycol monostearate or hexaglycerol distearate in the range of about 0.5 to 1.5% and a minor proportion of a combination of ethoxylated sorbitan ester in the range of about 0.3 to 0.6%, sorbitan monostearate in the range of about 0.05 to 0.25% and lecithin in the range of about 0 to 0.15%, said emulsion being substantially stable against separation and/or gelation for at least about one year at room temperature under aseptic conditions and whippable in the temperature range from about 40° to 100° F. to at least about 200% overrun. It is preferred that the thickener be a major proportion of microcrystalline cellulose and a minor proportion of sodium carboxymethyl cellulose. This emulsion has exceptional storage stability, which is thought to result from the unusual combination of emulsifiers employed. Food grade ingredients are used throughout.

DETAILED DESCRIPTION OF THE INVENTION

Typical formulations of the whippable emulsion are shown in Table I.

TABLE I

| Ingredient | Broad Range % | Preferred Range % | Function |
| --- | --- | --- | --- |
| Sucrose crystals | 7–20 | 12–15 | Sweetener |
| Sodium caseinate | 0.5–2.5 | 1.25–2.0 | Whipping agent |
| Microcrystalline cellulose | .1–.75 | 0.25–0.60 | Thickener (Stabilizer) |
| Fat--preferably of hard butter quality | 20–30 | 22.0–28.0 | Bodying & whipping agent |
| Propylene glycol monostearate or hexaglycerol distearate | 0.50–1.50 | 1.0–1.5 | Emulsifier |
| Polysorbate 60 | 0.2–0.5 | 0.3–0.4 | Emulsifier |
| Sorbitan monostearate | .05–.25 | 0.1–0.2 | Emulsifier |
| Polysorbate 80 | 0.01–0.10 | 0.01–.05 | Emulsifier |
| Lecithin | 0–0.15 | 0.08–0.12 | Emulsifier |
| Beta-carotene-S-beadlets | 0–0.1 | .003–.006 | Coloring |
| Sodium metaphosphate | 0.1–1 | 0.2–0.6 | Buffer |
| Water | 45–60 | 55–60 | Carrier |
| Total | 100 | 100 | |

These are "single strength" formulations which make ready-to-whip emulsions.

Formulations of concentrated emulsions for dilution at the rate of 2 volume parts of the emulsion to one volume part of water before whipping are shown in Table II.

TABLE II

| Ingredient | Broad Range % | Preferred Range % |
| --- | --- | --- |
| Sucrose crystals | 15–30 | 18.0–24.0 |
| Sodium caseinate | 0.75–4.0 | 1.5–2.5 |
| Microcrystalline cellulose | 0.1–1.0 | 0.4–0.8 |
| Fat--preferably of hard butter quality | 30–50 | 35.0–45.0 |
| Propylene glycol monostearate or hexaglycerol distearate | 0.25–2.5 | 1.0–2.0 |
| Polysorbate 60 | 0.1–1.0 | 0.3–0.6 |
| Sorbitan monostearate | 0.1–0.50 | 0.2–0.4 |
| Polysorbate 80 | 0.01–0.10 | 0.03–0.07 |
| Lecithin | 0–0.25 | 0.12–0.20 |
| Beta-carotene-S beadlets | 0.0–0.1 | 0.005–0.01 |
| Sodium metaphosphate | 0.1–0.5 | 0.2–0.6 |
| Water | 30–40 | 30–40 |
| Total | 100.00 | 100.00 |

Typical processing is as follows: the sugar and caseinate solids are dry blended. In a separate vessel the microcrystalline cellulose, coloring agent, flavor and phosphate buffer are added to the water and agitated and heated to about 100° F. The dry blend of sugar and caseinate is then added to the warmed aqueous mixture and the mixture further heated to 120° F. with agitation. The emulsifiers then are added, and finally the fat. The mixture is heated to about 160° with agitation until a smooth, uniform mixture results. This uniform mixture is sterilized at about 295° F. for six seconds, then cooled to about 165°–170° F. and aseptically homogenized through a homogenizing valve with a back pressure of 1,500–3,000 psig to form the emulsion. The thus commercially sterile, homogenized emulsion then is cooled to 40°–100° F. and introduced into the aseptic package under aseptic conditions and the package sealed.

The preferred fat is one that exhibits hard butter properties so it has excellent mouth feel and a melting point at approximately body temperature (98.6° F.). Such fat will be ostensibly hard at 50°–70° F. and from about 70° up to about 110° F. loses virtually all, if not all, of its solids content upon warming. Other fats can be used, but those with W.M.P. substantially above 114° F. often have a slightly waxy mouth feel. The fats can be of vegetable (including nut) or animal origin, e.g. hydrogenated or unhydrogenated palm kernel, coconut, cottonseed, soybean, peanut, palm, tallow, lard, etc.

Stabilizer comprising a major proportion of water-insoluble components is preferred. Microcrystalline cellulose is an excellent stabilizer or thickener for this purpose; the commercially available products usually, and preferably, contain a minor proportion of sodium carboxymethyl cellulose. Other stabilizers that can be used in conjunction with such cellulose or even by themselves include: sodium carboxymethyl cellulose, quar, gum arabic, locust bean, acacia, tragacanth, carrageenan, xanthan, agar, ghatti, or karaya.

The preferred sweetener is sucrose, which can be obtained in crystalline or liquid form, the latter having water that has to be compensated for in formulation. Other nutritive sweeteners that can be used include: corn syrup solids, dextrose, fructose, glucose, lactose, or corn syrup. Non-nutritive sweeteners such as sodium saccharin can be used, these, of course, being in extremely small proportion.

Emulsification of the fat is done with about 2–5% food approved emulsifier and most generally with less than 4% because some of the necessary emulsifiers in stronger proportion can impart undesirable flavor. The major part of the emulsifier is either a partial fatty ester of propylene glycol or a fatty polyglycerol ester. By "fatty" in the specification is meant there is an edible fatty acid moiety. Such fatty acid moiety being one or more even-numbered $C_{12-22}$ saturated or unsaturated monocarboxylic acid. The fatty acid generally is quite highly saturated for hardness, e.g. to an iodine value (I.V.) of at least as low as about 60 and preferably much lower, i.e., 0–3.

The partial fatty ester of propylene glycol usually is made by reacting propylene glycol with an edible fat followed by distillation of excess polyol from the neutralized alkali-catalyzed reaction mixture. The resulting purified emulsifier is typically 35–60% partial fatty esters of propylene glycol mixed with partial esters of glycerin. The partial fatty esters or specifically the monoester can be distilled from the reaction mixture to provide a material of higher purity. Alternatively, such ester for this use can be made by direct esterification of propylene glycol with a fatty acid to give 40 to 85% propylene glycol monoester with the remainder being propylene glycol diester. The propylene glycol monoester can be distilled from the fatty acid reaction products to provide a monoester of 80–95% purity.

The fatty acid ester of polyglycerol customarily can be made by esterifying a polyglycerol broadly having 2–10 glycerol units, preferably 5–7, with 1.5 to 3 fatty acid units on the average. Also, the polyglycerol ester may be prepared by interesterifying the polyglycerol with hydrogenated triglycerides of 60 I.V. or lower.

The other minor emulsifiers preferably are fatty acid esters of sorbitan and ethoxylated sorbitan esters, although these can be replaced by other corresponding hexitan and ethoxylated hexitan esters, such as those prepared from mannitol and ethoxylated partial esters of glycerol. Mono and diglycerides may also be utilized in an attempt to reduce the whipping time for these emulsions without affecting the stability.

It is preferred to buffer the mixture with sodium metaphosphate or sodium hexametaphosphate, monosodium phosphate, disodium phosphate, trisodium phosphate, mono, di, or tripotassium phosphate, tetrasodium pyrophosphate, tetrapotassium pyrophosphate sodium or potassium tripolyphosphate, potassium metaphosphate, sodium trimetaphosphate, sodium tetrametaphosphate. This imparts additional resistance to gelation and minimizes deleterious heat effect on the mixture. Edible colorants such as beta-carotene in minute proportion and frequently a minute amount of flavor such as an artificial edible butter flavor is added in the emulsion. Other colorants and even certain vitamins can be added if desired.

Much of the emulsion processing is done at a temperature above the melting point of the fats and any emulsifiers present to achieve a fine grade emulsification. The homogenization is done conventionally, usually by passing the preformed emulsion through a pressure reducing valve with enormous pressure drop.

The preferred way to package the emulsion is by aseptic packaging, such as aseptic canning, or by aseptic form-fill-and seal procedures when the container is made of laminated plastics. The container is a conventional hermetically sealed one such as a metal can appropriately lacquered with an inert lining, or a hermetically sealed glass container, plastic container or paper bottle, the latter being appropriately lined with food-approved coatings.

In such operation the emulsion is heat sterilized at 280°–325° F., then poured into a presterilized container under aseptic conditions, and the container is aseptically sealed. For effective sterilization the emulsion can be heated to 320°–325° F. with no holding time necessary. At low temperatures, i.e. 280°–290° F., holding time can be from 2–10 seconds. Alternatively, the unsterilized emulsion can be poured into an unsterilized container, the container sealed, and the filled container subjected to retorting or the like at 220°–260° F. for 15–60 minutes, or the sterilized emulsion may be poured into chemically or heat treated "long-life" containers and subsequently stored at refrigerated conditions for purposes of obtaining extended shelf stability at refrigerated temperatures. Frequently, particularly in the aseptic processing, the homogenization is done after sterilizing the emulsion and at a temperature of 130°–190° F. under aseptic conditions preparatory to filling the sterile container. For clarity, the term "sterile" or "commercially sterile" product is defined as one capable of remaining sterile for a minimum of one year of shelf life at room temperature or a minimum of 24 weeks at 100° F.

When the resulting sterile product is opened, it must, of course, be refrigerated to prolong its shelf life. The single strength emulsion can be poured and whipped at room temperature or at a temperature of 40°–100° F. for 3–5 minutes with a conventional electric mixer to yield a topping having an overrun in excess of 200%. The concentrated emulsion can be poured and whipped at room temperature or at 40°–100° F. with a conventional mixer to yield a topping having an overrun in excess of 200%. Two parts of the concentrated emulsion are admixed with one part of water. If desired, cold milk can be used for dilution instead of water to achieve an even richer product.

The following examples show how this invention may be practiced, but should not be construed as limiting the invention. In this specification all parts are parts by weight, all percentages are weight percentages and all temperatures are in degrees Fahrenheit unless otherwise expressly noted. To prepare the emulsion utilized in each of the following examples the procedure described herein is followed:

1. The entire amount of the protein (caseinate) is dry blended with some of the sweetener (sugar). If liquid sweetener (syrups) is used, the caseinate can be dispersed into the requisite amount of water and the resulting aqueous solution can be added to the liquid sweetener.

2. To the correct amount of water, well agitated, the stabilizer, buffer, coloring agent, and flavorant are added. The resulting aqueous mixture is heated to about 100° F.

3. To the luke-warm water is added the dry blend of caseinate-sugar mixture as well as the remainder of the sugar.

4. The entire aqueous mixture of (3) is heated to about 120°–125° F. at which time the fat and emulsifiers are added.

5. The mixture resulting in (4) is heated to about 145°–160° F. and pumped to a surge tank wherein the mixture is kept agitated.

6. The mixture is rendered commercially sterile by heat. Depending on the available equipment or the desired sterilizing procedure, the mixture can be heated directly with steam infusion or injection, or indirectly such as by circular tube, plate (press), or scraped surface heat exchangers. In-can sterilization can be accomplished in a retort, if desired. Normally, sterilization values ($F_o$) equivalent from about 10 to 50 minutes at 250° F. are desired to achieve the required shelf-stability.

7. Subsequent to heat treatment the mixture is homogenized aseptically at pressures of from 500 to 6,000 psi and at a temperature above the melting point of the fat and emulsifiers. The same pressure and temperature conditions are applicable to incontainer sterilization.

8. The heat treated product can be packaged by any suitable process into presterilized containers such as glass jars, pouches, laminated, molded or formed plastic containers or cans. A typical unit is a Dole aseptic canning unit which is capable of providing aseptic medium for the cans, their lids, and the canning process.

EXAMPLE 1

Following the procedure described above, 2 parts of sodium caseinate were mixed with some sucrose (13.50 parts total) to provide an intimately mixed dry blend. To 58.20 parts of potable water the following ingredients were added: 0.25 part microcrystalline cellulose (Avicel 581), 0.003 part of 2.4% betacarotene-S beadlets, and 0.25 part sodium metaphosphate as buffer. The water mixture was warmed to about 100° F. with agitation. The caseinate-sugar blend and the remainder of sugar were then added to the agitated warm water which was heated up to about 120° F., at which temperature 24.0 parts of hard butter fat (Durkee's Paramount X: Wiley Melting Point of about 110° F., contains 0.4% lecithin) and the following emulsifiers were added: 0.30 part polysorbate 60 (Durfax 60), 0.19 part sorbitan monostearate (Durtan 60), 0.05 part polysorbate 80 (Durfax 80), and 1.25 part of propylene glycol monostearate (PGMS). The entire liquid-fat-emulsifier mixture was heated to about 150° F. and then transferred by pumping to a surge tank. The admixture was then sterilized utilizing all the sterilization procedures described earlier such as circular tube heat exchanger, scraped surface heat exchanger, a plate or press heat exchanger, steam infusion or steam injection heat exchanger or a falling film heat exchanger, all working especially well. For convenience, a Dole aseptic unit which provides for sterilizing the cans into which the emulsion will be stored works quite well. The emulsion herein was sterilized for 4 seconds at 290° F.

The single strength emulsion was stored in the can for a year at room temperature (about 70° F.) and tested afterwards showing excellent properties and maintaining sterile and stable conditions.

The evaluation procedure is as follows:

Samples of the processed emulsion are stored at about −20° F., 0° F., 40° F., 70° F., 84° F. and 100° F. for periods of up to 1 year. Additional samples are cycled from about −20° F. to about 40° F. for a minimum of 5 cycles. Representative samples from each storage condition are withdrawn from storage at regular intervals and are evaluated for stability and performance at both 40° F. and 70° F.

Emulsion viscosity, color, fat and/or serum separation, pH, whip time, whipped specific gravity, penetration after whipping (stiffness), resistance to air coalescence, and resistance to syneresis and shrinkage are the properties which are measured for storage evaluations.

The normal range of viscosity for the single strength emulsion is 190 to 300 cps at 70° F. and 300 to 800 cps at 40° F. For more concentrated emulsions the range is 1,000 to 2,000 cps at 70° F. and 2,000 to 3,500 cps at 40° F.

The color of the emulsions is measured subjectively by visual observation. However, if darkening or browning of the emulsion is evident or questionable, the color is measured with the aid of a colorimeter.

Fat and/or serum separation is measured by observation of the emulsion upon opening of the container. For one quart of emulsion the separation should not exceed a 1 cm. supernatant layer.

The whip time of the emulsion will vary with both the temperature of the mix and the type of mixing equipment used. The consumer may use either a household type hand-held mixer or an institutional type mixer ranging in capacity from 5 to 80 quarts. The whip time in a household type mixer will vary from about 2 to 10 minutes when the initial emulsion temperature is 70° F. and will vary from about 2 to 5 minutes when the initial emulsion temperature is 40° F. The whip time in an institutional type mixer will range from about 3 to 10 minutes when the initial emulsion temperature is 40° F. and will range from about 3 to 10 minutes when the initial emulsion temperature is 70° F.

The whipped specific gravity is determined by a fixed volume to weight relationship. An inverse relationship exists between the amount of aeration (overrun) and the specific gravity. A specific gravity range of from 0.20 to 0.40 is usually achievable. A specific gravity of about 0.25 is preferred.

The penetration after whipping is determined with the aid of a Precision Penetrometer equipped with a 55-gram blunt bob. The bob is allowed to penetrate the whipped mass for approximately 30 seconds. Penetration readings on whipped products may vary appreciably depending on the intended use and preference of the user. Thus, a penetration reading of 10 to 25 millimeters would be indicative of a household preference whereas a penetration reading of 3.0 to 10.0 would be indicative of an institutional preference.

The resistance to air coalescence and shrinkage are determined by filling containers of known volume with whipped product and subsequently storing the containers at both room temperature and 40° F. for from 4 to 8 hours. The product should not exhibit excessive air coalescence when observed through a cross section and should not exhibit any substantial decrease in volume.

EXAMPLE 2

Example 1 was repeated where the major emulsifier was hexaglycerol distearate ester with the same excellent results.

EXAMPLE 3

A concentrated emulsion was prepared in the same manner described in Example 1 except the amounts were as follows (sodium caseinate: 2.2 parts, sucrose: 20 parts, Avicel 581: 0.5, fat (Paramount): 40 parts, polysorbate 60: 0.5 part, sorbitan monostearate: 0.23 part, polysorbate 80: 0.05 part, propylene glycol monostearate: 1.50 part, beta-carotene-S-beadlets: 0.007 part and the balance of about 35 parts of potable water. Again the results as evaluated according to the procedure described earlier were excellent.

EXAMPLE 4

Example 3 was repeated except that the major emulsifier was hexaglycerol distearate ester. The results were substantially the same.

EXAMPLE 5

Examples 1 and 4 were repeated utilizing corn syrup (24 D.E. and 36 D.E.) in place of the sucrose with substantially comparable results.

EXAMPLE 6

Examples 1 and 2 were repeated utilizing stabilizers other than Avicel 581. In particular, locust bean gum and xanthan gum and carrageenan and a combination thereof were incorporated in about the same amount (0.5 part) showing comparable evaluation results.

As discussed earlier, the pourable emulsion described by the present invention can be prepared in "single strength" for immediate whipping by the user or in concentrated strength for dilution with water or other suitable liquid such as milk prior to whipping. In another aspect, then, the present invention is concerned with the process for preparing the liquid emulsion, which process is advantageously designed to provide the exceptionally long stability and whippability of the emulsion as described hereinbefore.

Briefly, the process for preparing the commercially sterile and pourable emulsion of the present invention comprises blending a sweetener, a proteinaceous component, a thickening agent, fat, and emulsifiers therefor in an aqueous medium to make up a liquid blend, homogenizing said blend to produce a stable emulsion, and packaging said emulsion in containers under sterile conditions, and wherein said emulsifiers are made up of a major proportion selected from the group consisting of fatty acid ester of propylene glycol and fatty acid ester of polyglycerol and a minor proportion selected from fatty acid partial esters of a polyol of three or more carbon atoms and their ethoxylated derivatives and lecithin.

More specifically, the process for preparing a liquid emulsion which is stable at room temperature for at least about one year, and which is capable of being whipped up to about 100° F. comprises the steps of forming an aqueous blend consisting essentially of, by weight, 45 — 60% water
7 — 20% sweetener
0.5 — 2.5% dispersible protein
0.1 — 0.75% thickener
0.1 — 1.0% buffer
20 — 30% fat and
0.75 — 2.5% emulsifiers wherein said emulsifiers comprise one major proportion selected from partial fatty acid esters of propylene glycol and fatty acid ester of polyglycerol and one minor proportion selected from fatty acid esters of a polyol having three or more carbon atoms and/or the corresponding ethoxylated derivatives and lecithin. Preferably the major proportion is in the range from about 0.5 to 1.5% and the minor proportion is a combination of sorbitan monostearate in the range from about 0.05 to 0.25%, ethoxylated sorbitan ester in the range from about 0.3 to 0.6% and lecithin in the range from about 0 to 0.15%.

What is claimed is:

1. A pourable, edible, homogenized emulsion consisting essentially of about 45 to 60% water, about 20 to 30% fat, about 7 to 20% sweetener, about 0.5 to 2.5% dispersible protein, about 0.1 to 0.75% thickener, about 0.1 to 1.0% buffer and about 0.75 to 2.5% emulsifier, said emulsifier consisting essentially of a major proportion of propylene glycol monostearate or hexaglycerol distearate in the range of about 0.5 to 1.5% and a minor proportion of a combination of ethoxylated sorbitan ester in the range of about 0.3 to 0.6%, sorbitan monostearate in the range of about 0.05 to 0.25% and lecithin in the range of about 0 to 0.15%, said emulsion being substantially stable against separation and/or gelation for at least about one year at room temperature under aseptic conditions and whippable in the temperature range from about 40° to 100° F. to at least about 200% overrun.

2. An emulsion according to claim 1 wherein said thickener comprises a major proportion of water-insoluble thickener.

3. An emulsion according to claim 2 wherein said water-insoluble thickener is microcrystalline cellulose.

4. An emulsion according to claim 1 wherein said thickener comprises a major proportion of microcrystalline cellulose and a minor proportion of sodium carboxymethyl cellulose.

5. An emulsion according to claim 1 in sterile condition.

6. An emulsion according to claim 1 wherein said buffer is sodium metaphosphate.

7. An emulsion according to claim 5 packaged in a sealed, interiorly sterile container.

8. An emulsion according to claim 7 wherein said thickener comprises a major proportion of microcrystalline cellulose and a minor proportion of sodium carboxymethyl cellulose and said buffer is sodium metaphosphate.

* * * * *